(12) United States Patent
Griswold et al.

(10) Patent No.: US 7,408,906 B2
(45) Date of Patent: Aug. 5, 2008

(54) MOBILE DATA COMMUNICATIONS APPARATUS, METHODS AND COMPUTER PROGRAM PRODUCTS IMPLEMENTING CELLULAR WIRELESS DATA COMMUNICATIONS VIA A WIRELESS LOCAL AREA NETWORK

(75) Inventors: Doug Griswold, Cary, NC (US); Ron Bexten, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 1247 days.

(21) Appl. No.: 10/079,159

(22) Filed: Feb. 20, 2002

(65) Prior Publication Data

US 2003/0156566 A1 Aug. 21, 2003

(51) Int. Cl.
*H04Q 7/24* (2006.01)
*G06F 15/16* (2006.01)

(52) U.S. Cl. .................. 370/338; 370/335; 370/349; 370/352; 370/392; 370/466; 455/404; 455/406; 455/418; 455/439; 455/456.1; 709/206; 709/230; 709/238; 709/245

(58) Field of Classification Search .................. 370/338, 370/349, 352–356, 231–237, 395.1–421, 370/335, 392, 466; 455/404, 406, 418, 439, 455/456.1; 709/206, 230, 238, 245
See application file for complete search history.

(56) References Cited

U.S. PATENT DOCUMENTS 5,533,019 A * 7/1996 Jayapalan .................... 370/352
6,101,531 A * 8/2000 Eggleston et al. ........... 709/206
6,160,804 A * 12/2000 Ahmed et al. ............... 370/349
6,463,271 B1 * 10/2002 Schroeder et al. ........... 455/561
6,496,694 B1 * 12/2002 Menon et al. ............ 455/426.2
6,876,863 B1 * 4/2005 Schroeder et al. ........... 455/466
6,940,869 B1 * 9/2005 Wang et al. .................. 370/466
7,031,266 B1 * 4/2006 Patel et al. ................... 370/254

(Continued)

OTHER PUBLICATIONS

GPRS, General Packet Radio Service, White Paper by Usha Communications Technology, Jun. 26, 2000, 23 pages.

(Continued)

*Primary Examiner*—Edan Orgad
*Assistant Examiner*—Venkatesh Haliyur
(74) *Attorney, Agent, or Firm*—Myers Bigel Sibley & Sajovec PA

(57) ABSTRACT

A mobile data communications system includes a cellular wireless data communications network, such as a GPRS or CDPD network, including a plurality of base stations that communicate with terminals according to a first radio interface. The plurality of base stations are coupled to a control node, such as a GPRS Serving GPRS Support Node (SGSN) or a CDPD Mobile Data Intermediate System (MD-IS), that administers services, such as mobility management and billing, for terminals communicating with the base stations. The system also includes a wireless local area network (LAN), such as a mobile IP network, that is operative to communicate with terminals according to a second radio interface. The system further includes a mobile data internetworking system that is coupled between the control node and the wireless local area network and that provides data communications therebetween. The wireless LAN may have a coverage area that overlaps or adjoins a coverage area of the cellular wireless data communications network, such that, for example, higher user densities and/or data rates may be supported in "hot spots," such as airports, hotels, convention centers and the like.

23 Claims, 5 Drawing Sheets

U.S. PATENT DOCUMENTS

| | | | |
|---|---|---|---|
| 7,058,059 B1 * | 6/2006 | Henry et al. | 370/395.1 |
| 7,068,624 B1 * | 6/2006 | Dantu et al. | 370/331 |
| 7,136,631 B1 * | 11/2006 | Jiang et al. | 455/414.1 |
| 7,225,238 B1 * | 5/2007 | Dantu et al. | 709/219 |
| 2002/0150091 A1 * | 10/2002 | Lopponen et al. | 370/389 |

OTHER PUBLICATIONS

White Paper, GPRS White Paper, Cisco, http://www.ieng.com/warp/public/cc/so/neso/gprs/gprs_wp.htm, Jan. 8, 2002, 19 pages.

Ekeroth et al., GPRS Support Nodes, Ericsson Review No. 3, 2000, pp. 156-169.

Rsvagy, Peter, "Emerging Technology: Clear Signals for General Packet Radio Service," http://www.networkmagazine.com/article/NMG20001129S0002/2, Jan. 8, 2002, 4 pages.

802.11a: A Very High-Speed, Highly Scalable Wireless LAN Standard, White Paper, Proxim, Inc., 2001, 5 pages.

* cited by examiner

MOBILE DATA COMMUNICATIONS APPARATUS, METHODS AND COMPUTER PROGRAM PRODUCTS IMPLEMENTING CELLULAR WIRELESS DATA COMMUNICATIONS VIA A WIRELESS LOCAL AREA NETWORK

BACKGROUND OF THE INVENTION

The present invention relates to wireless communications, and more particularly, to wireless mobile data communications.

Wireless local area networks (LANs) are commonly used to provide data communications over small areas, such as the interior of a building. These networks typically support a high density of users and/or high-bandwidth users, such that services like networked document management and web browsing can be offered at a high level of service quality. However, these wireless LANs typically use radio interfaces that are limited in range.

Larger areas are commonly served by cellular wireless data communications networks, such as General Packet Radio Services (GPRS) or Cellular Digital Packet Data (CDPD) networks. These systems may be extended indoors using, for example, microcells and/or distributed antenna systems. Such cellular wireless data communications systems may be limited in the user data rate and/or user density they can support, and may not be compatible with many types of wireless terminals.

SUMMARY OF THE INVENTION

In some embodiments of the present invention, a mobile data communications system includes a cellular wireless data communications network, such as a GPRS or CDPD network, including a plurality of base stations that communicate with terminals according to a first radio interface. The plurality of base stations are coupled to a control node, such as a Serving GPRS Support Node (SGSN) or a CDPD Mobile Data Intermediate System (MD-IS), that administers services, such as mobility management and billing, for terminals communicating with the base stations. The system also includes a wireless local area network (LAN), such as a mobile IP network, that is operative to communicate with terminals according to a second radio interface. The system further includes a mobile data internetworking system that is coupled between the control node and the wireless local area network and that provides data communications therebetween.

In particular, the cellular wireless data communications network may be operative, via the mobile data internetworking system, to manage services for a terminal communicating with the wireless LAN according to the second radio interface, even if the terminal does not support the first radio interface. For example, the cellular wireless data communications network may be operative to identify the terminal communicating with the wireless LAN as a subscriber to the cellular wireless data communications network. The wireless LAN may have a coverage area that overlaps or adjoins a coverage area of the cellular wireless data communications network, such that, for example, higher user densities and/or data rates may be supported in "hot spots," such as airports, hotels, convention centers and the like. The present invention may be embodied in mobile data communications systems, mobile data internetworking systems, wireless communications methods, and computer program products that support wireless data communications.

DETAILED DESCRIPTION

Figure 1:
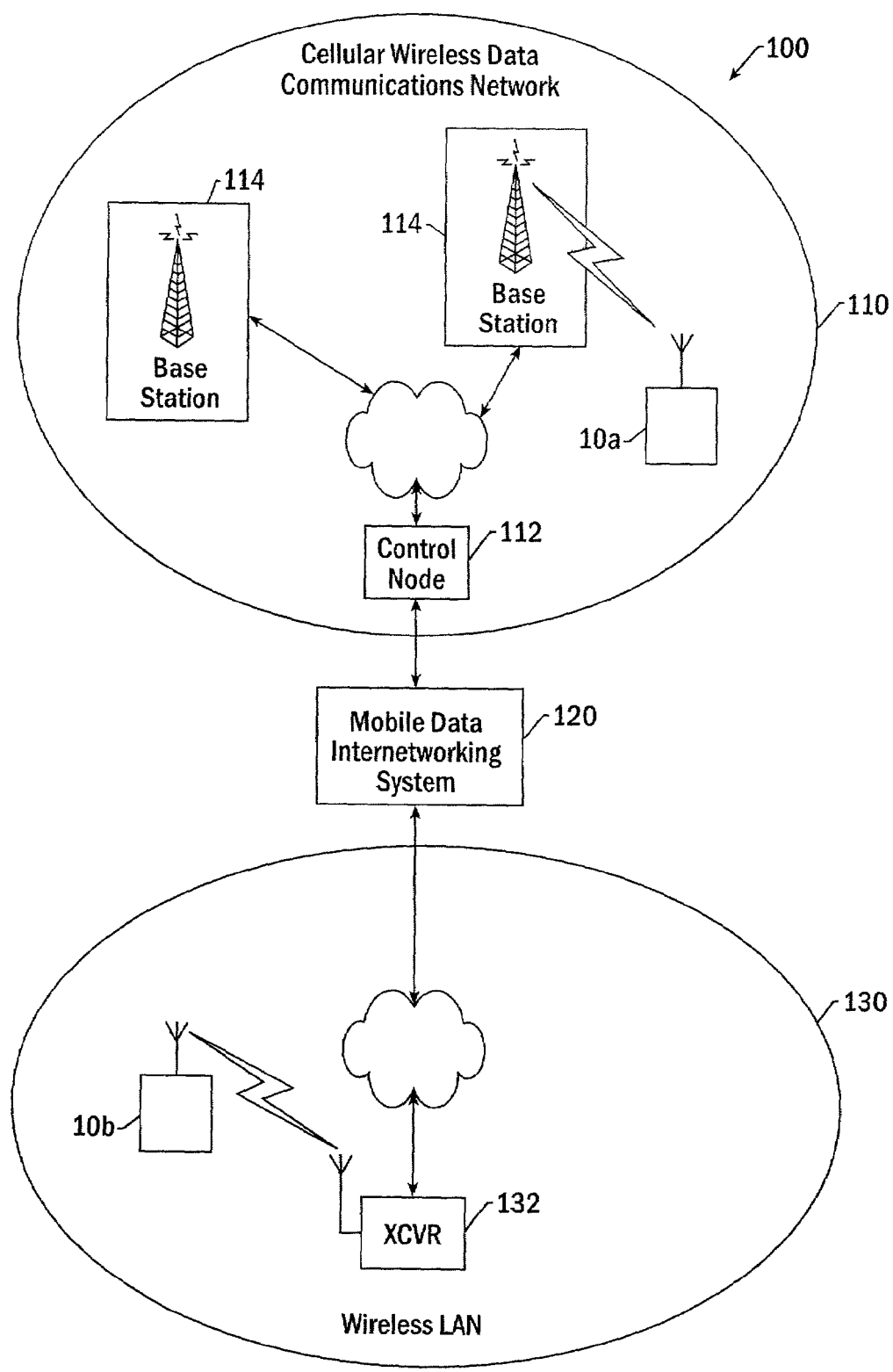
FIG. 1 is a schematic diagram of the mobile data communications system according to some embodiments of the present invention.

The present invention will now be described more fully with reference to the accompanying drawings, in which typical embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

According to embodiments of the present invention, mobile data communications systems, methods and computer program products relating to the internetworking of a cellular wireless data communications system with a wireless LAN may be provided. As used herein, "cellular wireless data communications network" refers to, but is not limited to, GPRS, CDPD and other conventional cellular data networks. As also used herein, "wireless LAN" refers to, but is not limited to, wireless local area networks conforming to standards such as IEEE 802.11(a)-(b), Bluetooth™ networks, and other conventional wireless local networks.

In the present application, FIGS. 1-5 are schematic diagrams illustrating exemplary apparatus and operations according to embodiments of the present invention. It will be understood that blocks of the schematic diagrams, and combinations of blocks therein, may be implemented using one or more electronic circuits, such as a circuits included in a component of a wireless communications system. It will also be appreciated that, in general, blocks of the schematic diagrams, and combinations of blocks therein, may be implemented in one or more electronic circuits, such as in one or more discrete electronic components, one or more integrated circuits (ICs) and/or one or more application specific integrated circuits (ASICs), as well as by computer program instructions which may be executed by a computer or other data processing apparatus, such as a microprocessor or digital signal processor (DSP), to produce a machine such that the instructions which execute on the computer or other programmable data processing apparatus create electronic circuits or other means that implement the operations specified in the block or blocks. The computer program instructions may also be executed on one or more computers or other data processing apparatus to cause a series of operations to be performed on the computer(s) or other programmable apparatus to produce a computer implemented process such that the instructions which execute on the computer(s) or other programmable apparatus provide operations for implementing the operation specified in the block or blocks.

The computer program instructions may also be embodied in the form of a computer program product in a computer-readable storage medium, i.e., as computer-readable program code embodied in the medium for use by or in connection with an instruction execution system. The computer-readable storage medium may include, but is not limited to, electronic, magnetic, optical or other storage media, such as a magnetic or optical disk or an integrated circuit memory device. For example, the computer program instructions may be embodied in memory included in component of a wireless communications system and/or in an apparatus and/or storage medium operable to program such memory. Accordingly, blocks of the schematic diagrams of FIGS. 1-5 support electronic circuits and other means that perform the specified operations, acts for performing the specified operations, and computer program products configured to perform the specified operations.

FIG. 1 illustrates a mobile data communications system 100 for communicating with terminals 10a, 10b according to embodiments of the present invention. The system 100 includes a cellular wireless data communications system 110 that includes a plurality of base stations 114 that are operative to communicate with terminal 10a that supports a first radio interface, for example, a radio interface conforming to the General Packet Radio Service (GPRS) standard or the Cellular Digital Packet Data (CDPD) standard. The base stations 114 are coupled to a control node 112 that performs mobility management and other functions associated with communications with the terminal 10a.

The system 100 further includes a wireless local area network (LAN) 130. As illustrated, the wireless LAN 130 includes one or more radio transceivers 132 that provide radio communications with a terminal 10b that supports a second radio interface, for example, an IEEE 802.11(a), and IEEE 802.11(b), or a Bluetooth™ radio interface. The wireless LAN 130 is coupled to the control node 112 of the cellular wireless data communications network 110 by a mobile data internetworking system 120. For example, in embodiments of the present invention described below, the mobile data internetworking system 120 can provide protocol conversion between a cellular wireless networking protocol used by the cellular wireless data communications system 110, e.g., a protocol that includes features related to mobility management or other cellular network operations, and a data packet routing protocol, e.g., Internet Protocol (IP), used by the wireless LAN.

The present invention arises from a realization that desirable performance features may be provided by combining a cellular wireless data communications network that can provide extensive coverage, such as a GPRS or CDPD network, with a wireless LAN that provides other desirable characteristics, such as increased data rate and/or user density, in selected smaller areas within and/or adjacent the cellular coverage area. For example, in GPRS or CDPD embodiments, the GPRS or CDPD network may be used to provide data communications services in a geographically extensive area, for example, the service area of the cellular telephone network over which the GPRS or CDPD network is overlaid, while one or more wireless LANs may be used to serve "hot spots" with higher date rate users and/or high user density, for example, airport terminals, hotels, and convention centers.

By coupling the wireless LAN to a control node of the cellular network, the mobile data internetworking system can allow terminals using the wireless LAN to be managed from the cellular network, which can provide services such as mobility management, billing, and the like. In addition, the internetworking system can allow the cellular network to manage a terminal on the wireless LAN, even if the terminal is unable to support the radio interface of the cellular network. Thus, for example, billing and other services can be offered across the wireless LAN and the GPRS or CDPD network without requiring the use of dual-mode terminals or extensive modification of the GPRS or CDPD network.

Figure 2:
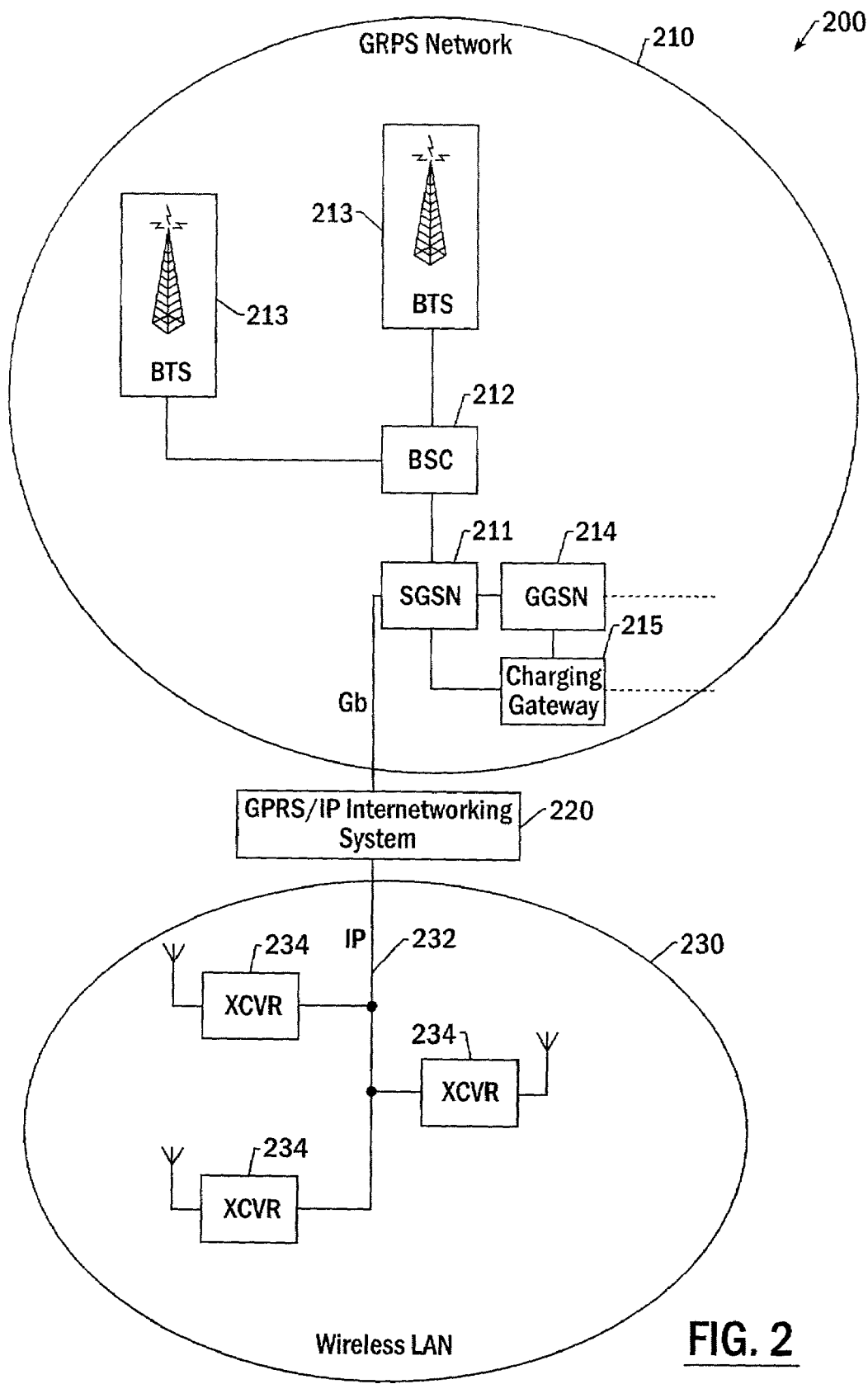
FIG. 2 is a schematic diagram of a mobile data communications system including a GPRS component according to further embodiments of the present invention.

FIG. 2 illustrates a GPRS-based mobile data communications system 200 according to some embodiments of the present invention. The system 200 includes a GPRS network 210, which includes a Serving GPRS Support Node (SGSN) 211 that is coupled to Base Transceiver Sites (BTSs) 213 via a Base Station Controller (BSC) 212. The SGSN 211 communicates with the BSC 212 (and, ultimately, with the BTSs 213) using a cellular wireless networking protocol suite that supports, among other things, mobility management within the network 210. The GPRS network 210 further includes a Gateway GPRS Support Node 214, which can provide a connection to an external network, and a charging gateway 215, which can be used by the GPRS network operator to log usage information received from the SGSN 211 for subsequent transfer to a billing system (not shown). The system 200 further includes a wireless LAN 230, here shown as including a plurality of radio transceivers 234 that are linked by an IP backbone network 232. The IP backbone network 232 is coupled to the SGSN 211 of the GPRS network 210 via a GPRS/IP internetworking system 220.

Figure 3:
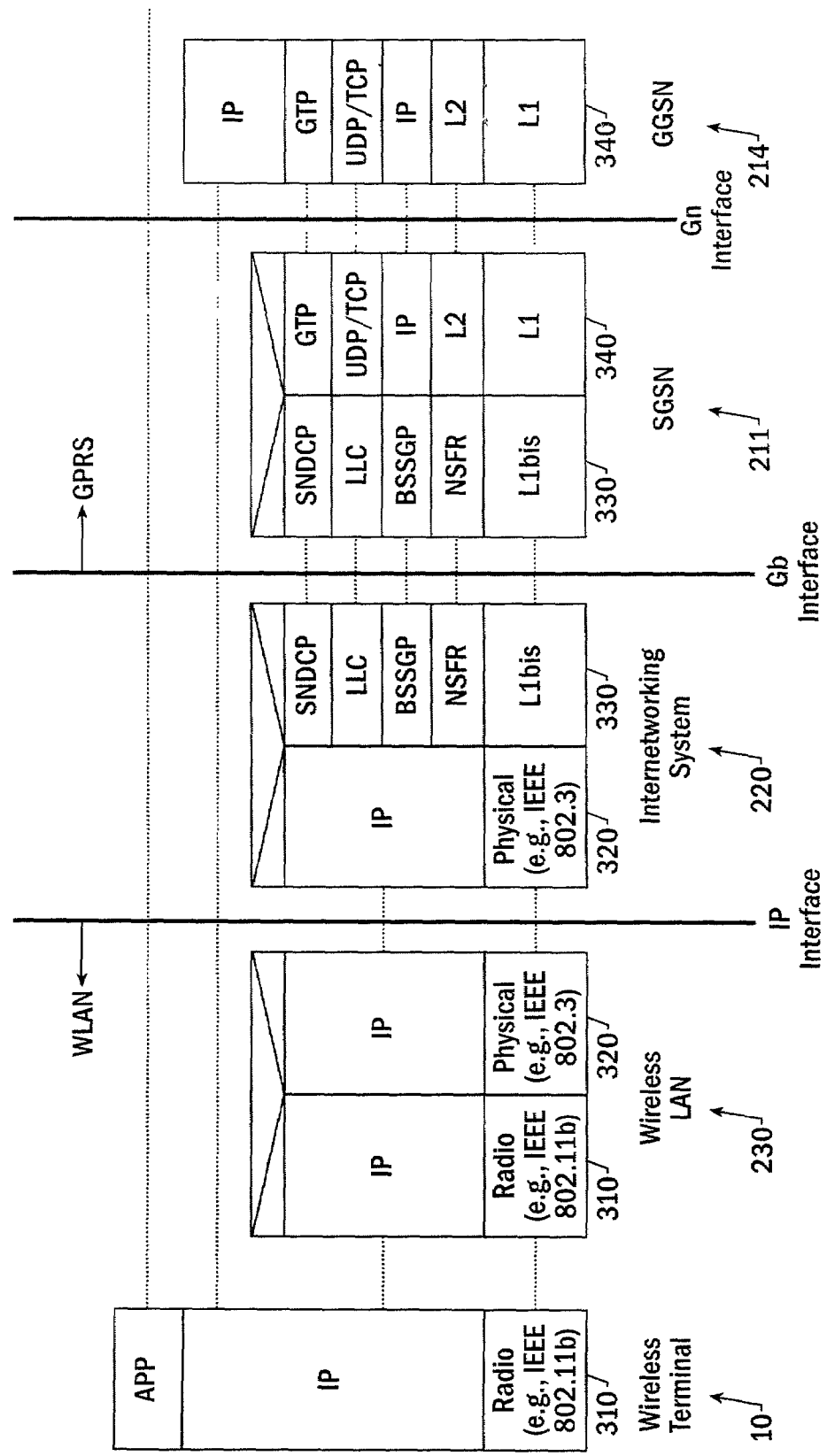
FIG. 3 is a protocol diagram for the mobile data communications system of FIG. 2.

FIG. 3 is a protocol diagram applicable to the system 200 illustrated in FIG. 2. A wireless terminal 10 implements a protocol stack 310 including an application layer that resides on an IP network layer and a radio physical layer, for example, a physical layer implementing a IEEE 802.11b radio interface. The wireless LAN 230 provides conversion between the protocol stack 310 and a protocol stack 320 having a different physical layer, e.g., a physical layer implementing an IEEE 802.3 Ethernet interface. The mobile data internetworking system 220 provides conversion between the protocol stack 320 and GPRS cellular wireless networking protocol stack 330, i.e., a protocol stack supporting the standard "Gb" interface used by an SGSN to communicate with a BSC in a GPRS network. The SGSN 211 provides conversion between the protocol stack 330 and a protocol stack 340 that supports a standard "Gn" interface used by the SGSN 211 to communicate with the GGSN 214.

As known to those skilled in the art, the protocol suite used for the Gb interface supports mobility management and other features associated with the cellular nature of the GPRS network 210. For example, as shown in FIG. 3, the protocol stacks 330, 340 that implement the Gb and Gn interfaces include, beside non-cellular network and transport layers (e.g., IP, TCP, UDP), protocols that are specific to data routing over a cellular wireless network, including:

1. GPRS Tunneling Protocol (GTP), which tunnels protocol units (e.g., IP datagrams received from or intended for an external network via a GGSN) to and from a mobile terminal;
2. Sub-Network Dependent Convergence Protocol (SNDCP), which maps a network-level protocol, such as IP or X.25, to an underlying logical link control, providing such functions as compression, segmentation and multiplexing of network-layer messages to a single virtual connection;
3. Logical Link Control (LLC), a link layer protocol that provides for reliable transfer of user data across a cellular wireless network;
4. Base Station System GPRS Protocol (BSSGP), which processes routing and quality of service (QoS) information for the base station subsystem (BSS); and 5. Network Service Frame Relay (NSFR), which maps BSSGP service requests to appropriate frame relay services.

These protocols are tailored to provide data packet routing for a cellular wireless network, such that "normal" datagrams, e.g., IP datagrams, are encapsulated in messages that include information that supports mobility management and other features peculiar to a cellular wireless network. Functions of these protocol layers are described in detail in a white paper *GPRS: General Packet Radio Service*, available at http://www.mobilein.com/GPRS.pdf. As shown in FIG. 3, IP packets may be transmitted from a GGSN 214 to a wireless LAN terminal 10 via a SGSN 211. However, it will be appreciated that similar transmission of IP packets could be achieved to and from a wireless terminal in communication with a base station served by the SGSN 211 (or another SGSN).

The architecture illustrated in FIGS. 2 and 3 can provide many advantageous features. For example, the system 200 can be configured to serve a variety of different types of terminals, including terminals that only support the radio interface of the wireless LAN 230, such as a laptop computer having a wireless LAN card. In particular, such terminals can utilize features (e.g., billing) of the GPRS network 210 while operating in a "hot spot" served by the wireless LAN 230. The SGSN 211, via the internetworking system 220, could view the wireless LAN 230 as a base station of the GPRS network 210, accounting for use of the GPRS network 210 by a terminal communicating via the wireless LAN 230 as if the terminal were actually in direct radio communication with a base station 213 of the GPRS network 210. This could be achieved, for example, by associating a GPRS user identity with IP packets embedded in a GPRS-compatible messages transmitted between the SGSN 211 and the internetworking system 220, such that conveyance of the IP packets in the GPRS network 210 could be charged to a particular account, for example, an account associated with a sender and/or recipient of the IP packets.

It will be appreciated that a number of techniques for managing communications in such mobile data communications systems, such as differential billing based on the type of service used (e.g., GPRS-only, wireless LAN only, or mixed mode) or flat-rate billing, fall within the scope of the present invention. Terminals having a dual-mode capability could be similarly served, with the internetworking unit 220 providing support for switching between the GPRS network 210 and the wireless LAN 230 based on such considerations as location of the terminal, quality of signals communicated to or from the terminals, data rate demands of the terminal (e.g., short messaging versus web browsing), available network capacity, and the like.

It will be understood that, in general an internetworking system according to embodiments of the present invention, such as the internetworking system 220, may support services including, but not limited to, layer tunneling and/or termination, data packet buffering, and, as mentioned above, proxy services for terminals without cellular radio capabilities. It will be further appreciated that a GPRS network 210 could also serve GPRS-only terminals, while the wireless LAN 230 could also support terminals that make use only of the wireless LAN 230.

Figure 4:
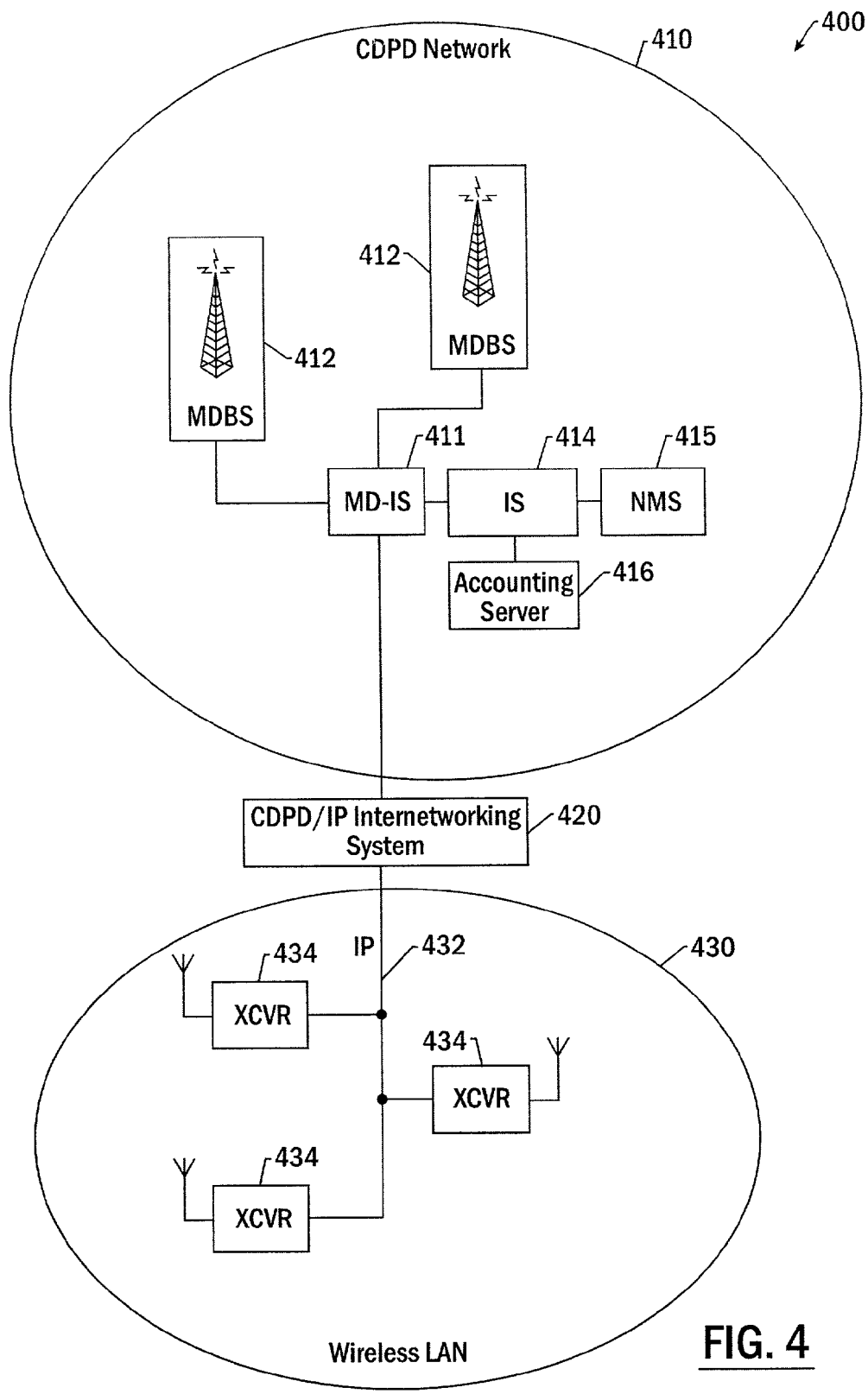
FIG. 4 is a schematic diagram of a mobile data communications system including a CDPD component according to further embodiments of the present invention.

The present invention is not limited to GPRS applications. For example, as shown in FIG. 4, a CDPD-based mobile data communications system 400 can be provided according to other embodiments of the present invention. The system 400 includes a CDPD network 410, including a Mobile Data Intermediate System (MD-IS) 411 that is coupled to one or more Mobile Data Base Station (MDBS) and an Intermediate System (IS) 414 that couples the MD-IS 411 to one or more Fixed End Systems (F-ES's), such as a Network Management System (NMS) 415 and an accounting server 416. The system 400 further includes a wireless LAN 430, here shown as including a plurality of radio transceivers 434 tied together by an IP backbone network 432. A CDPD/IP internetworking system 420 links the IP backbone network 432 to the MD-IS 411, and can provide a similar functionality to that described above with reference to the GPRS-based system 200 of FIG. 2. It will be further appreciated that the invention may be used in other mobile data network configurations than those illustrated in FIGS. 2 and 4.

Figure 5:
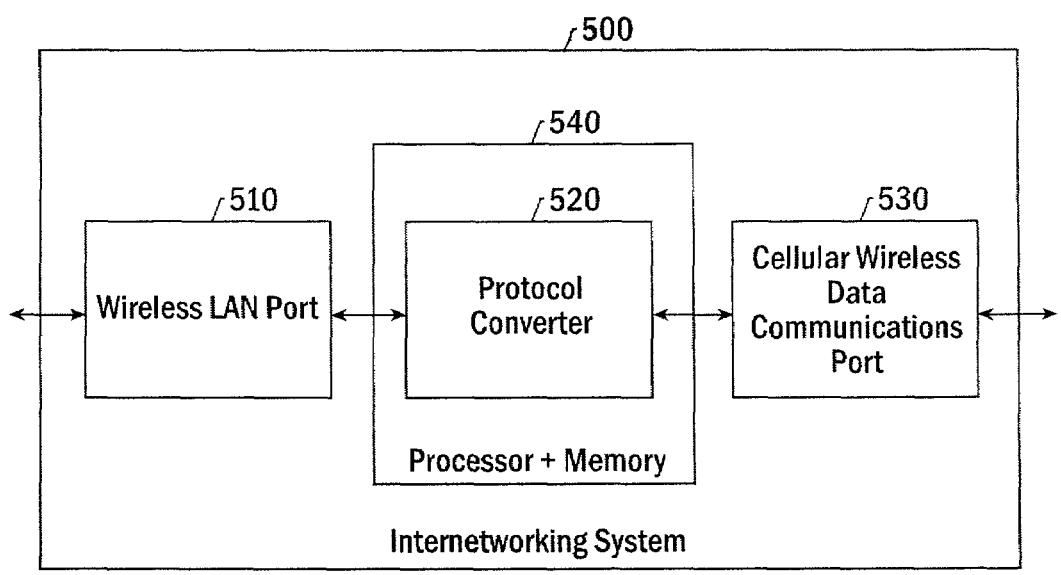
FIG. 5 is a schematic diagram of a mobile data internetworking system according to some embodiments of the present invention.

FIG. 5 illustrates a mobile data internetworking system 500 according to further embodiments of the present invention. The internetworking system 500 includes a first port 530 configured to connect to a control node of a cellular wireless data communications system, e.g., to a SGSN of a GPRS network or a MD-IS of a CDPD network. The internetworking system 500 also includes a second port 510 configured to connect to a wireless LAN, e.g., an IEEE 802.11b network. The internetworking system 500 further includes a protocol converter 520 operative convert between a cellular wireless networking protocol used by the control node, e.g., the GPRS protocol suite described above with reference to FIG. 3, and a data packet routing protocol, e.g., IP, used by the wireless LAN. As shown in FIG. 5, the protocol converter 520 may comprise program code stored and executed in a combination of a processor and memory 540. According, FIG. 5 also supports a computer program product embodying such program code.

It will be understood that mobile data internetworking systems according to the present invention, such as the internetworking systems 120, 220, 500 described above, may be implement in a number of different ways. In particular, an internetworking system according to the present invention may be implemented as an electronics unit designed to connect to a SGSN, MD-IS or the like, or may be distributed across multiple electronics units. For example, all or portions of a mobile data internetworking system could be combined with an SGSN in a single unit. In general, internetworking systems according to the present invention may be implemented using special-purpose hardware, such as application specific integrated circuits (ASICs) or other custom circuitry, general-purpose hardware, such as microprocessors or digital signal processors (DSP) executing software and/or firmware, or combinations thereof.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A mobile data communications system comprising:
a cellular wireless data communications network comprising a plurality of base stations that communicate with terminals according to a first radio interface, the plurality of base stations coupled to a control node that administers services provided to terminals communicating with the base stations, wherein the cellular wireless data communications network comprises one of a General Packet Radio Service (GPRS) network or a Cellular Digital Packet Data (CDPD) network, and wherein the control node comprises a corresponding one of a Serving GPRS Support Node (SGSN) or a Mobile Data Intermediate System (MD-IS);

a wireless local area network (LAN) operative to communicate with terminals according to a second radio interface; and a mobile data internetworking system that is coupled between the control node and the wireless local area network and that provides data communications therebetween, wherein the mobile data internetworking system is interfaced to the control node using a same interface that interfaces the control node to each of the plurality of base stations, wherein communications between the mobile data internetworking system and the control node use a mobility management protocol layer that supports mobility management in the cellular wireless data communications network and wherein communications between terminals and the mobile data internetworking system do not use a mobility management layer that supports mobility management in the cellular wireless data communications network.

2. A system according to claim 1, wherein the cellular wireless data communications network is operative, via the mobile data internetworking system, to manage services for a terminal communicating with the wireless LAN according to the second radio interface.

3. A system according to claim 2, wherein the cellular wireless data communications network is operative to identify the terminal communicating with the wireless LAN as a subscriber to the cellular wireless data communications network.

4. A system according to claim 2, wherein the cellular wireless data communications network is operative to manage services for a terminal communicating with the wireless LAN even if the terminal is incapable of supporting the first radio interface.

5. A system according to claim 2, wherein the cellular wireless data communications network is operative to assign communications charges for the terminal communicating with the wireless LAN.

6. A system according to claim 1, wherein the cellular wireless data communications network further comprises a gateway node operative to communicate between the control node and an external network according to a data packet routing protocol layer used in communicating between terminals and the mobile data internetworking system.

7. A system according to claim 1, wherein the wireless LAN comprises an IP network.

8. A system according to claim 1, wherein the wireless LAN has a coverage area that overlaps or adjoins a coverage area of the cellular wireless data communications network.

9. A system according to claim 8, wherein the coverage area of the wireless LAN is substantially smaller than the coverage area of the cellular wireless data communications network.

10. A system according to claim 8, wherein the wireless LAN is capable of providing substantially higher-bandwidth communications to an individual terminal than the cellular wireless data communications network.

11. A system according to claim 8, wherein the wireless LAN is capable of serving a higher density of terminals than the cellular wireless data communications network.

12. A system according to claim 1, wherein the cellular wireless data communications network comprises a data communications overlay network configured to utilize network infrastructure in common with a cellular radiotelephone network.

13. A mobile data internetworking system comprising:

a first port configured to be connected to one of a SGSN or MD-IS that administers services provided to terminals that communicate according to a first radio interface with base stations of a corresponding one of a GPRS or CDPD cellular wireless data communications network, wherein the first port is interfaced to the one of a SGSN or MD-IS using a same interface that interfaces the one of a SGSN or MD-IS to each of a plurality of base stations of the corresponding GPRS or CDPD cellular wireless data communications network;

a second port configured to be connected to a wireless LAN that communicates with terminals according to a second radio interface; and a protocol converter coupled between the first and second ports and operative to convert between a first protocol stack used by the control node of the cellular wireless data communications network, the first protocol stack comprising a mobility management layer that supports mobility management in the cellular wireless data communications network, and a second protocol stack used for communications with terminals via the wireless LAN, the second protocol stack lacking a layer corresponding to the mobility management layer.

14. An internetworking system according to claim 13, wherein the protocol converter enables the cellular wireless data communications network to manage services for terminal that is in wireless communication with the wireless LAN.

15. An internetworking system according to claim 13, wherein the protocol conversion subsystem enables the cellular wireless data communications network to identify the terminal in wireless communication with the wireless LAN as a subscriber to the cellular wireless data communications network.

16. An internetworking system according to claim 1, wherein the second port is configured to connect to an IP network.

17. A method of providing mobile data communications services, comprising:

linking a cellular wireless data communications network comprising a control node that administers communications between terminals and a plurality of base stations according to first radio interface to a wireless LAN operative to communicate with terminals according to a second radio interface, wherein the cellular wireless data communications network comprises one of a General Packet Radio Service (GPRS) network or a Cellular Digital Packet Data (CDPD) network, and wherein the control node comprises a corresponding one of a Serving GPRS Support Node (SGSN) or a Mobile Data Intermediate System (MD-IS); and managing services for a terminal in radio communication with the wireless LAN from the control node of the cellular wireless data communications network, wherein managing services for the terminal in radio communication with the wireless LAN from the control node of the cellular wireless data communications network comprises:

communicating information between the one of the SGSN or MD-IS and an internetworking system coupled between the one of the SGSN or MD-IS and the wireless LAN using a mobility management protocol layer that supports mobility management in the cellar wireless data communications network using a same interface that interfaces the one of the SGSN or MD-IS to each of a plurality of base stations of the corresponding GPRS or CDPD cellular wireless data communications network; and communicating information between the terminal and the internetworking system via the wireless LAN without use of a mobility management layer that supports mobility management in the cellular wireless data communications network.

18. A method according to claim 17, wherein managing services for a terminal in radio communications with the wireless LAN from the control node of the cellular wireless data communications network comprises managing services for the terminal as if the terminal is a subscriber to the cellular wireless data communications network.

19. A method according to claim 17, wherein the terminal is incapable of supporting the first radio interface.

20. A method according to claim 17, wherein the wireless LAN comprises an IP network.

21. A method according to claim 17, wherein the cellular wireless data communications network comprises a data communications overlay network configured to utilize network infrastructure in common with a cellular radiotelephone network.

22. A computer-readable medium embodied with a computer program configured to execute in a computer of an internetworking system that couples one of a SGSN or MD-IS that administers services provided to terminals that communicate according to a first radio interface with base stations of a corresponding one of a GPRS or CDPD cellular wireless data communications network to a wireless LAN that communicates with terminals according to a second radio interface, the computer program comprising:

instructions operative to convert between a first protocol stack of an interface used by the one of a SGSN or MD-IS of the corresponding one of a GPRS or CDPD cellular wireless data communications network to interface to each of a plurality of base stations of the corresponding one of the GPRS or CDPD cellular wireless data communications network, the first protocol stack comprising a mobility management layer that supports mobility management in the corresponding one of a GPRS or CDPD cellular wireless data communications network, and a second protocol stack used by the wireless LAN, the second protocol stack lacking a mobility management layer that supports mobility management in the cellular wireless data communications network.

23. A computer-readable medium according to claim 22, wherein the instructions are operative to convert between one of a GPRS or a CDPD cellular wireless networking protocol and IP.

* * * * *